Feb. 19, 1935.  E. R. CASE  1,991,594
FLUID TIGHT JOINT FOR PNEUMATIC TIRES
Filed Oct. 9, 1931
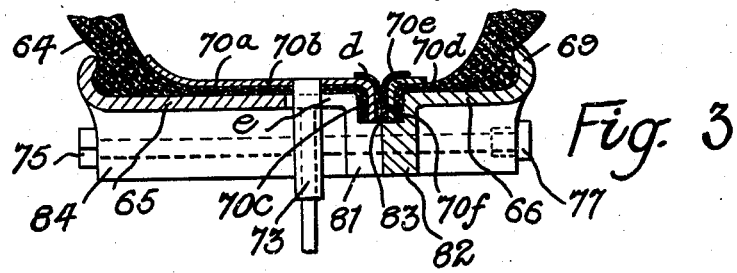
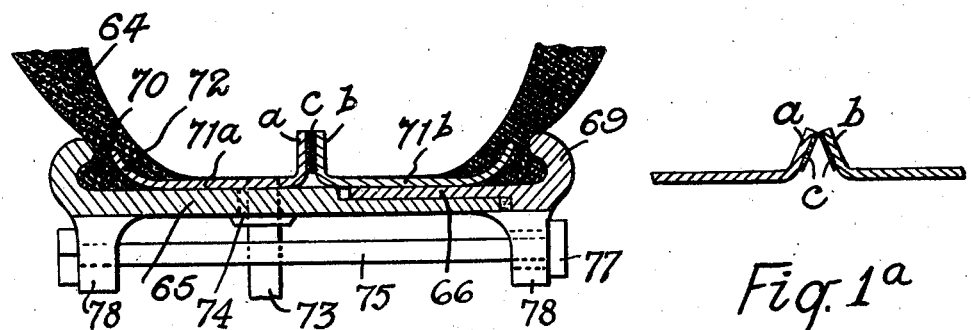
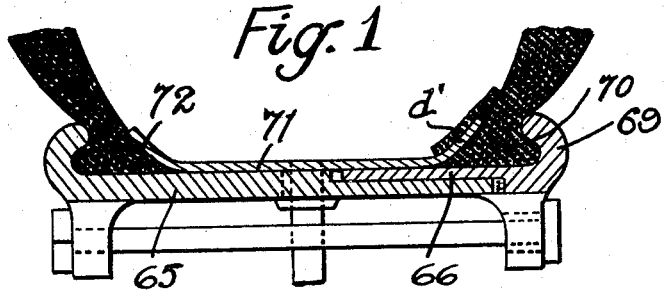
INVENTOR
E. R. Case Patented Feb. 19, 1935

1,991,594

UNITED STATES PATENT OFFICE 1,991,594

FLUID-TIGHT JOINT FOR PNEUMATIC TIRES

Egerton Ryerson Case, Toronto, Ontario, Canada

Application October 9, 1931, Serial No. 567,858

8 Claims. (Cl. 152—13)

My invention relates to improvements in fluid-tight joints for pneumatic tires and the object of the invention is to seal the inner separable or divided side of a tire-casing by a single separable joint mechanically effected and maintained which will not be affected by variations in internal air pressure or temperature, thus providing means to dispense with the air-tube now commonly used, and in the following specification and drawing forming part thereof, I shall describe and illustrate various species within my invention, and what I claim as new will be set forth in the claims forming part of this specification.

The prior art shows that many efforts have been made to dispense with the inner air-tube. Some inventions have been designed to use the air-pressure within a tire-casing to seal lip-provided flanges thereof, and others have been designed to use mechanical means to seal the divided side of the said tire-casing. In the first class of inventions mentioned, only one joint is used, but it is self-evident that to maintain this joint sealed a constant air-pressure must be maintained; under practical conditions this is impossible for any reasonable length of time.

In the second class of inventions mentioned, two joints are mechanically sealed, one at each side of a tire-casing, and more or less elaborate mechanical means, and specially constructed tire-casings, must be used, thus unnecessarily adding to cost of manufacture.

The present invention, in its preferred form, aims to use the ordinary tire-casing and so avoid scrapping of existing mould equipment, and to avoid as much as possible any radical change in principle of wheel and/or hub-rim construction on which the tire-casing is to be mounted.

The present invention is aimed further to avoid any necessity to "spring" the casing-air-tube over the sides of the wheel and/or hub-rim when placing or removing it and so facilitate the handling thereof.

Figs. 1, 2 and 3 are cross sections through casing-air-tubes, and suitable supporting means therefor in the form of wheel and/or hub-rims, illustrating the application of the principle of this invention, and Fig. 1a is a cross section showing the relative positions of the flanges of the lips forming the preferred form of sealing-ring shown in Fig. 1, before sealing-pressure is applied thereto.

In the drawing, like characters of reference refer to the same parts.

I produce what I term a casing-air-tube by utilizing a tire-casing having spaced portions (preferably in the form of the usual beadings) on its inner divided side formed to co-act with suitable supporting means therefor preferably in the form of a two-part rim of a wheel or hub and combining therewith means joined to one or to both of said spaced portions or beadings in the form of a lip or two lips or lip-sections (hereinafter referred to as a sealing-ring) inherently stiff or mechanically suitably braced or stiffened.

The stiff sealing-ring permits (a) ease of mounting the casing-air-tube on its support and its removal therefrom; (b) correct location of those parts of the sealing-ring that immediately co-act (as in Figs. 1 and 3) or that part of the sealing-ring that contacts with its associated side of the tire-casing (as in Fig. 2) to effect sealing, and (c) the mechanical locking of the casing-air-tube on its support substantially simultaneously with the sealing thereof through an opposing thrust offered to mechanical pressure exerted inwardly against said tire-casing by the act of mounting it on its support.

It is clear that I do not depend upon air-pressure to force the tire-casing into locking engagement with the rim, or its equivalent, nor to seal the joint.

Any type or form of supporting means, may be used that will permit the placing and removal of the casing-air-tube carried thereby, and which means may be manipulated to cause sealing or unsealing of the casing-air-tube.

The preferred form of sealing-ring is made in two sections or lips 71a and 71b. The outer sides 72 of these sections or lips are preferably flanged and are joined, as by vulcanization to the beading 70 of the tire-casing 64, in any suitable position. The said sections or lips are of substantially the same size and are provided with preferably outturned flanges a and b, at their inner portions, each faced with suitable elastic material c, such as rubber, or rubber compound, or otherwise constructed so as to co-act under mechanical pressure to form a fluid-tight separable joint. Before pressure is applied against said lips or sections, the flanges a and b occupy more or less the relative positions shown in Fig. 1a. When pressure is applied to hold the mounted casing-air-tube in place, through inward movement given said sections the flanges a and b thereof will be caused to occupy more or less the positions shown in Fig. 1 thus sealing the separable side of the casing-air-tube.

65 and 66 are the sections of a suitable type of wheel and/or hub-rim that may be used to support and to hold the casing-air-tube in place and at the same time to generate and maintain sealing-pressure for the sealing-ring. Each of these sections is provided with a flange 69 of suitable shape, and these flanges engage the spaced portions of beadings 70, on the inner side of the casing-air-tube.

Any suitable means may be employed to tie the sections of said wheel and/or hub-rim together. For example, these sections may be provided with lugs 78 through which pass the tie-rods 75. Nuts 77 threaded on the free ends of said tie-rods tie the sections of the rim of the wheel or hub together.

In this preferred disclosure, the sealing-ring section 71a is shown provided with an opening in which is mounted an air-valve 73. When this air-valve as located, is used, the wheel and/or hub-rim section 65 must be slotted as shown by dotted lines at 74 since the casing-air-tube is placed and removed transversely of said rim and also to allow necessary movement of either or of both of said sections 71a and 71b during sealing. The section 66 of the rim is placed in position after the casing-air-tube is placed and is of course removed before the casing-air-tube can be removed, since the rim-section 65 is designed to receive support direct from the axle (not shown) of the wheel or hub, in any suitable manner.

In Fig. 2, the sealing-ring or lip is shown in the form of a single element, and the side d' thereof is suitably joined to its associated beading of the tire-casing. The side 72 of this form of sealing-ring or lip and its associated beading, are pressed and held together to effect and to maintain sealing.

In Fig. 3, I show the sealing-ring in the form of lips or lip-sections 70a and 70d which are made of rubber or rubber compound and suitably made part of the tire-casing in any manner well-known in the art of tire manufacture. These lips or lip-sections must of course possess reasonable stiffness in order that they may occupy the proper positions when the casing-air-tube is to be mounted for use, and they may be stiffened in any desired manner. For example, I have stiffened, or braced, them by backing them with the ring-sections 70b and 70e, (preferably made of metal, as are also the sealing-ring sections or lips referred to in the other figures) respectively which are preferably vulcanized thereto. These lips or ring-sections are provided respectively with inturned flanges 70c and 70f, and these flanges are faced by rubber or rubber compound d and preferably backed by parts of the lips 70a and 70d.

With the form of my invention disclosed in Fig. 3, the rim of the wheel or hub is considerably modified in construction so as to hold in sealing contact the flanges 70c and 70f aforesaid. This necessitates providing the wheel and/or hub-rim sections 65 and 66 with inturned flanges 81 and 82 which are recessed on their inner faces to form a circumferential chamber 83 which houses the said flanges 70c and 70f.

By means of the pierced ribs 84 the tie-rods 75 may be passed therethrough to tie the rim-sections 65 and 66 together and so generate and maintain the sealing force for the joint of the casing-air-tube.

In Fig. 3, the air-valve 73 is shown as carried by the sealing-ring section 70b. This air-valve extends through a slot e formed in portion of the rim-section 65 and opens into a slot formed in the flange 81 of the rim of the wheel or hub.

While in Fig. 3 the lips of the tire-casing are shown as integrally formed part thereof, they may be separately formed and then suitably joined to said tire-casing.

In all forms of my invention since the lips and/or sealing ring sections, are joined to the tire-casing, no parts can be misplaced.

The term "stiff" is used in this specification, and the claims thereof, to mean that the sealing-ring must offer sufficient resistance to substantial permanent change in shape while being placed on, or removed from the support therefor, and, when subjected to mechanical pressure to be able to utilize this pressure through its own nature to assist in effecting substantially simultaneously the sealing and the mechanical locking of the casing-air-tube.

The term "joined" is used to mean that the sealing means may be integrally formed with the tire-casing at time of manufacture thereof, as in Fig. 3, to form a fluid-tight union, or independently formed and vulcanized thereto as in Figs. 1 and 2.

That portion of the wall of my casing-air-tube otherwise called a sealing-ring, is of such a nature that the said tube will have a substantially constant internal diameter; and since this wall-section, in its various forms, coacts with the beadings of the casing backed by the flanges 69, or their equivalent, there will be substantially no movement of this casing-air-tube transversely of the supporting member therefor. It therefore follows that no matter what the internal air-pressure may be, the said casing-air-tube cannot be sprung over the flanges of the supporting means therefor. Since the air-valve 73, in the disclosures made, is carried by the stiff wall in question, and is in contact with portion of the supporting means for the casing-air-tube, "creeping" of the latter is practically impossible.

While I have described and illustrated what I consider to be the best embodiments within my invention, it must be understood that the principle thereof may be embodied in various other forms without departing from the spirit of my invention and the scope of my claims.

What I claim as my invention is:

1. In combination to constitute a pneumatic tire; a casing-air-tube consisting of a tire-casing divided on its inner side; stiff substantially non-elastic circular means forming portions of the wall thereof joined to said divided side and which means has only one separable joint to be sealed; a two-part supporting member adapted to carry said casing-air-tube, and means to removably couple together the parts of said supporting member and whereby at time of said coupling action mechanical pressure is exerted against the sides of said casing-air-tube to decrease the distance separating same thereby moving said stiff means to cause the joint thereof to be sealed and held sealed.

2. The combination with a tire-casing having spaced portions on its inner divided side formed to be removably received by the spaced side flanges of a supporting member therefor, of a stiff substantially non-elastic sealing-ring carried by said tire-casing and located between said portions thus forming the inner wall of the said casing and having only one separable joint the sealing of which can be mechanically effected and maintained.

3. In combination, a casing-air-tube consisting of a tire-casing; stiff circular means forming the inner wall thereof and having only one separable joint and substantially non-elastic so as to maintain the diameter of the air-tube substantially constant at all times, and a ring-like side-flange-provided support the flanges of which exert pressure laterally against the sides of said casing-air-tube, as this latter is being firmly mounted on said support, to close and seal the said joint.

4. In combination, a substantially circular casing-air-tube having a single annular division in its inner wall which latter is of a different nature from the rest of the casing-air-tube and substantially non-elastic so as to maintain the diameter of the air-tube substantially constant at all times and is capable through its own nature of constantly reacting to a lateral force to close and seal said annular division, and a ring-like side-flange-provided support the flanges of which exert pressure laterally against the sides of said wall, as the casing air-tube is being firmly mounted on said support, to close and seal said annular division.

5. In combination to constitute a pneumatic tire; a casing-air-tube consisting of a tire casing divided on its inner side; stiff substantially non-elastic circular means forming a portion of the wall thereof joined to said divided side and which means has only one separable joint to be sealed; said divided side being adapted to be pressed laterally by the mounting of the tire to seal the joint.

6. A pneumatic tire according to claim 5, characterized in that the circular means is made in two sections each joined to a beading, the inner edges of the sections being flexible and held together to form the seal.

7. A pneumatic tire according to claim 5, characterized in that the stiff circular means is made in two sections each joined to a beading, the inner edge of each section being each provided with an in-turned flexible flange to form the joint.

8. A pneumatic tire according to claim 5, characterized in that the free edge of said circular means has an up-turned flange inclined towards the surface it contacts with when forming the seal.

EGERTON R. CASE.